United States Patent Office 2,799,688
Patented July 16, 1957

2,799,688
STEROIDS

Robert W. Jackson and John A. Hogg, Kalamazoo Township, Kalamazoo County, Mich., assignors to The Upjohn Company, Kalamazoo, Mich., a corporation of Michigan No Drawing. Application December 17, 1954,
Serial No. 476,060

9 Claims. (Cl. 260—397.1)

This invention relates to novel 3-keto-11α-sulfonyloxy-4,17(20)-pregnadiene-21-oic acid esters.

It is an object of the present invention to provide novel 3-keto-11α-sulfonyloxy-4,17(20) - pregnadiene - 21-oic acid esters and methods for their production and use. Other objects will be apparent to those skilled in the art to which this invention pertains.

The novel 3-keto-11α-sulfonyloxy-4,17(20)-pregnadiene-21-oic acid esters of the present invention may be prepared from corresponding 3-keto - 11α - hydroxy-4,17(20)-pregnadiene-21-oic acid esters or from the corresponding 11α-sulfonyloxyprogesterone all as disclosed more fully hereinafter. The novel 3-keto-11α-sulfonyloxy-4,17(20)-pregnadiene-21-oic acid esters of the present invention and methods for their production and use may be illustrated graphically as follows:

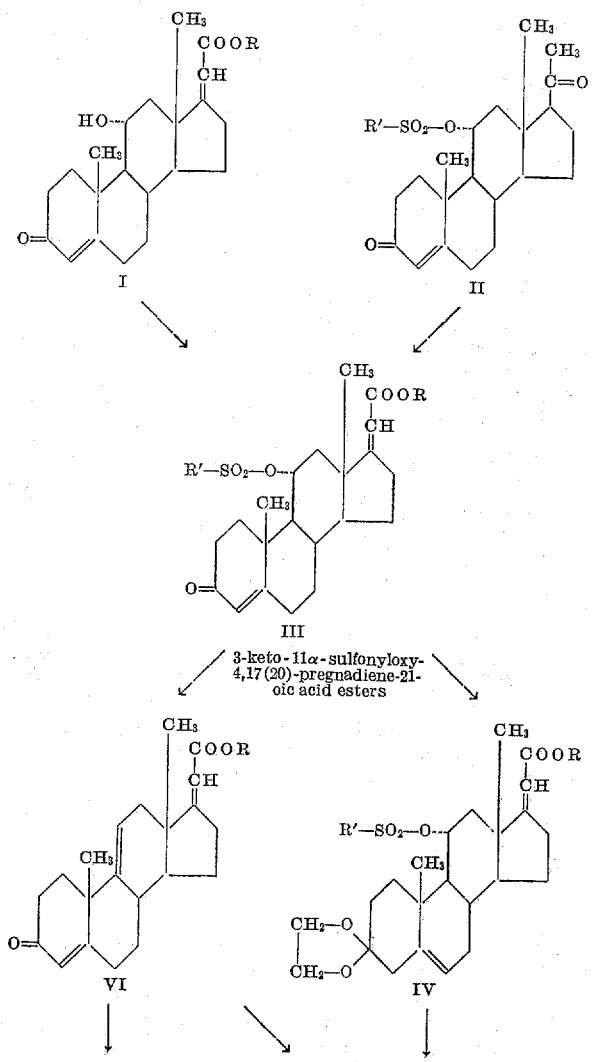

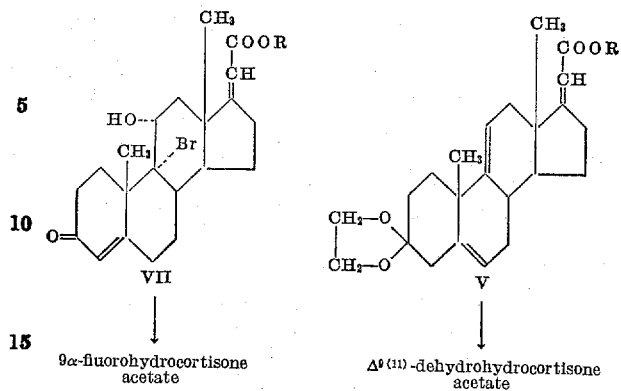

9α-fluorohydrocortisone acetate

Δ⁹⁽¹¹⁾-dehydrohydrocortisone acetate

In the formulae, R is lower-alkyl and R'—SO₂— is alkylsulfonyl, aralkylsulfonyl, cycloalkylsulfonyl, heterocycloaromaticsulfonyl, heterocyclicsulfonyl, alkarylsulfonyl, etc.

The novel 3 - keto - 11α - sulfonyloxy - 4,17(20) - pregnadiene-21-oic acid esters of the present invention are represented by Formula III, with R and R'—SO₂— having the values given above. The preferred R'—SO₂— radicals are hydrocarbon sulfonyl radicals, especially those containing from one to twelve carbon atoms, inclusive. Particularly preferred are the R'—SO₂— radicals which are monocyclic hydrocarbon-arylsulfonyl radicals containing from six to twelve carbon atoms, inclusive, i. e., benzenesulfonyl and hydrocarbon (e. g., alkyl) substituted benzenesulfonyl radicals. The novel compounds of the present invention wherein R is methyl or ethyl and R'—SO₂— is the para-toluenesulfonyl radical are especially preferred.

Examples of the compounds of the present invention are the methyl and ethyl esters of 3-keto-11α-sulfonyloxy-4,17(20)-pregnadiene-21-oic acid wherein the sulfonyloxy group is arylsulfonyloxy, e. g., benzenesulfonyloxy, para-toluenesulfonyloxy, m,m'-dimethylbenzenesulfonyloxy, o,o' - dimethylbenzenesulfonyloxy, sym.-trimethylbenzenesulfonyloxy, sym.-triethylbenzenesulfonyloxy, m-ethylbenzenesulfonyloxy, para-isopropylbenzenesulfonyloxy, m-n-butylbenzenesulfonyloxy, p-n-amylbenzenesulfonyloxy, p-n-hexylbenzenesulfonyloxy, p-n-heptylbenzenesulfonyloxy, p - n - octylbenzenesulfonyloxy, α-naphthenesulfonyloxy, β-naphthenesulfonyloxy, or is methylsulfonyloxy, ethylsulfonyloxy, propylsulfonyloxy, isopropylsulfonyloxy, butylsulfonyloxy, tert.-butylsulfonyloxy, isoamylsulfonyloxy, hexylsulfonyloxy, heptylsulfonyloxy, octylsulfonyloxy, α-pyridinesulfonyloxy, α-pyranesulfonyloxy, α - thiophenesulfonyloxy, α - furansulfonyloxy, α-tetrahydrofuransulfonyloxy, etc.

The novel compounds of the present invention (III) may be prepared by the esterification of a lower-alkyl 3-keto-11α-hydroxy-4,17(20)-pregnadiene - 21 - oate (I) with the selected substituted sulfonyl chloride or by the diglyoxalation with diethyloxalate and sodium methoxide in tertiary butyl alcohol for sixteen hours at below twenty degrees centigrade, tribromination, and rearrangement with sodium methoxide and methanol at below twenty degrees centigrade, of the corresponding 11α-sulfonyloxyprogesterone (II).

The novel compounds of the present invention are useful precursors to the known and physiologically active 9(11)-dihydrohydrocortisone acetate and 9α-fluorohydrocortisone acetate. For example, detosylation of methyl 3-keto-11α-tosyloxy-4,17(20) - pregnadiene - 21 - oate or other lower-alkyl ester is productive of a lower-alkyl ester of 3-keto-4,9(11),17(20)-pregnatriene-21-oic acid (VI). Ketalization of this compound with ethylene glycol in the presence of para-toluenesulfonic acid produces the 3-ethylene glycol ketal (V) which when reduced with lithium aluminum hydride in ether is productive of the 3-ethylene glycol ketal of 11β,21-dihydroxy-4,9(11),17(20)-pregnatriene-3-one. Hydrolysis of the 3-ketal group and then 21-acetylation of this latter compound with acetic anhydride in pyridine, followed by oxidative hydroxylation with osmium tetroxide and hydrogen peroxide in tertiary butyl alcohol, is productive of the known 9(11)-dehydrohydrocortisone acetate, which possesses adrenal cortical hormone activity and can also be converted by known methods to 9α-fluorohydrocortisone acetate.

Alternatively, a lower-alkyl ester of 3-keto-4,9(11),17-(20)-pregnatriene-21-oate (VI) can be prepared directly from a 11α-sulfonyloxyprogesterone via the compounds of the present invention by diglyoxalation and tribromination, in the manner described above, followed by reaction with sodium methoxide and methanol at a temperature above, for example, fifty degrees centigrade.

Alternatively, the 3 - keto - 11α-sulfonyloxy-4,17(20)-pregnadiene-21-oic acid esters (III) of the present invention can be 3-ketalized with ethylene glycol, in the manner described above, to produce the corresponding 3-ethylene glycol ketal (IV) which can then be desulfonated to produce the corresponding ketal of a 3-keto-4,9(11),17(20)-pregnatriene-21-oic acid ester (V).

A further alternative use involves the conversion of a compound of the present invention to lower-alkyl 3-keto-9(11),17(20)-pregnatriene-21-oate (V) as described above and then add hypobromous acid to the 9(11) double bond to produce an ester of 3-keto-9α-bromo-11β-hydroxy-4,17(20)-pregnadiene-21-oic acid (VII). Reacting this compound with sodium methoxide produces the corresponding 9:11-β-oxido compound. Opening the oxide with hydrogen fluoride in chloroform is productive of an ester of 3 - keto-9α-fluoro-11β-hydroxy-4,17(20)-pregnadiene-21-oic acid. Ketalization, reduction, hydrolysis, acetylation and oxidative hydroxylation of this compound in the manner described above is productive of 9α-fluorohydrocortisone acetate.

The following examples and preparation are illustrative of the products of the present invention and methods for their production, but are not to be construed as limiting.

PREPARATION.—METHYL 3-KETO-11α-HYDROXY-4,17(20)-PREGNADIENE-21-OATE

To a stirred solution of 22.60 grams (0.05 mole) of the sodium enolate of 11α-hydroxy-21-ethoxyoxalylprogesterone (U. S. 2,683,724) in 550 milliliters of methanol was added dropwise sixteen grams (0.1 mole) of bromine. To the thus-produced solution of 29.4 grams (0.05 mole) of 11α - hydroxy-21,21-dibromo-21-ethoxy-oxalylprogesterone was added (0.3 mole) of sodium methoxide in 500 milliliters of methanol. The reaction mixture was maintained at about 25 degrees centigrade for sixteen hours whereafter an equal volume of water was added thereto and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus ten percent acetone, four of methylene chloride plus fifteen percent acetone, two of methylene chloride plus twenty percent acetone, and finally, two of acetone. The methylene chloride plus ten percent acetone eluates and the first methylene chloride plus fifteen percent acetone eluate were combined and the solvent distilled therefrom. The seven grams of distillation residue was crystallized from a mixture of ethyl acetate and Skellysolve B hexane hydrocarbons to yield crystalline methyl 3-keto-11α-hydroxy-4,17(20)-pregnadiene-21-oate, melting at 205 to 210 degrees centigrade.

*Analysis.*—Calculated for $C_{22}H_{30}O_4$: C, 73.75; H, 8.48. Found: C, 73.77, 74.10; H, 8.38, 8.59.

Similarly, other lower-alkyl 3-keto-11α-hydroxy-4,17(20)-pregnadiene-21-oates are prepared wherein the ester is methyl, propyl, butyl, amyl, hexyl, heptyl, octyl, or the like, by replacing the sodium methoxide in methanol used in the above-described reaction by the selected alkali-metal alkoxide in an alkanol.

Alternatively, methyl 3-keto - 11α - hydroxy-4,17(20)-pregnadiene-21-oate can be hydrolyzed to the free 21-oic acid and reesterified, according to methods known in the art, to produce the desired lower-alkyl 3-keto-11α-hydroxy-4,17(20)-pregnadiene-21-oate.

*Example 1.—Methyl 3-keto-11α-(para-toluenesulfonyl)-4,17(20)-pregnadiene-21-oate*

A mixture of one gram of methyl 3-keto-11α-hydroxy-4,17(20)-pregnadiene-21-oate, one gram of para-toluenesulfonyl chloride and five milliliters of pyridine were maintained at about 25 degrees centigrade for 72 hours. The mixture was then poured into 100 milliliters of cracked ice and water and the precipitated product separated from the aqueous phase by filtration. The precipitate was dissolved in 75 milliliters of chloroform and the solution washed with fifty milliliters of water. The chloroform solution was then dried over anhydrous sodium sulfate and the chloroform then evaporated. The residue was dissolved in 25 milliliters of chloroform and poured over a chromatographic column of 75 grams of Florisil synthetic magnesium silicate. The column was developed with 100 milliliter portions of solvents of the following composition and order: three of Skellysolve B hexane hydrocarbons plus five percent acetone, three of Skellysolve B plus ten percent acetone, three of Skellysolve B plus twenty percent acetone, three of Skellysolve B plus thirty percent acetone and two of acetone. The Skellysolve B plus thirty percent acetone eluted 1.262 grams, a yield of 88.5 percent of the theoretical, of methyl 3-keto-11α-(para-toluenesulfonyloxy) - 4,17(20) - pregnadiene-21-oate which, after a crystallization from a mixture of 25 milliliters of hot acetone and 75 milliliters of Skellysolve B, weighed 1.03 grams, melted at 149 to 153 degrees centigrade, had an optical rotation $[\alpha]_D$ of plus seventy degrees in acetone and the analysis below.

*Analysis.*—Calculated for $C_{29}H_{38}O_6S$: C, 67.96; H, 7.08; S, 6.25. Found: C, 68.08; H, 7.54; S, 6.25.

Similarly, other alkyl 3-keto-11α-(para-toluenesulfonyloxy)-4,17(20)-pregnadiene-21-oates are prepared by substituting other esters of 3-keto-11α-hydroxy-4,17(20)-pregnadiene-21-oic acid in the esterification reaction with para-toluenesulfonyl chloride, e. g., alkyl esters and preferably lower-alkyl esters, for example, the ethyl, propyl, butyl, amyl, hexyl, heptyl, or octyl ester.

Following the procedure described in Example 1, but substituting another esterifying agent which produces an 11α-ester having an $SO_3$ group, other methyl 3-keto-11α-(sulfonyloxy)-4,17(20)-pregnadiene - 21 - oates are prepared, examples of which are those wherein the sulfonyloxy group is meta-toluenesulfonyloxy, benzenesulfonyloxy, para-biphenylsulfonyloxy, para-methoxybenzenesulfonyloxy, 2,6-dimethylbenzenesulfonyloxy, or the sulfonyloxy groups produced by the reaction of methyl 3-keto - 11α - hydroxy-4,17(20)-pregnadiene-21-oate with a sulfonyl chloride shown in Tables II, IV, VI, VII, VIII, IX, X, XI, XII, XIII, XIV, XV, XVI and XVII [pages 463 to 496 of Suter, "Organic Chemistry of Sulfur," Wiley, publ. (1944)] which preferably contain but one acid chloride group, to produce the corresponding ester thereof. Substituting another lower-alkyl ester of 3-keto-11α-hydroxy-4,17(20)-pregnadiene-21-oic acid for the corresponding methyl ester in these reactions will produce the corresponding lower-alkyl 3-keto-11α-(sulfonyloxy)-4,17-

(20)-pregnadiene-21-oate, e. g., compound where loweralkyl is ethyl, propyl, butyl, amyl, hexyl, heptyl, or octyl.

*Example 2.—Ethyl 3-keto-11α-(para-toluenesulfonyloxy)-4,17(20)-pregnadiene-21-oate*

In exactly the same manner as described in Example 1, ethyl 3-keto-11α-hydroxy-4,17(20)-pregnadiene-21-oate is esterified with para-toluenesulfonyl chloride to produce ethyl 3-keto - 11α - (para-toluenesulfonyloxy)-4,17(20)-pregnadiene-21-oate.

The following reactions are illustrative of a method for the conversion of the compounds of the present invention into known and/or physiologically active steroids.

METHYL 3-KETO-4,9(11),17(20)-PREGNATRIENE-21-OATE

A solution of 500 milligrams of methyl 3-keto-11α-(para-toluenesulfonyloxy)-4,17(20) - pregnadiene-21-oate in ten milliliters of collidine was refluxed at 172 degrees centigrade for thirty minutes. The reaction mixture was then cooled to room temperature and mixed with 100 milliliters of diethyl ether. The collidine was removed from the ether by washing with cold five percent hydrochloric acid. The ether layer was then dried over anhydrous sodium sulfate, filtered and the ether then distilled. There was thus obtained 0.316 gram of methyl 3-keto-4,9(11),17(20)-pregnatriene-21-oate which, after crystallization from a mixture of acetone and Skellysolve B, weighed 0.31 gram, a yield of 93.5 percent of the theoretical, melted at 165 to 170 degrees centigrade and had the analysis below.

*Analysis.*—Calculated for $C_{22}H_{28}O_3$: C, 77.61; H, 8.28. Found: C, 77.58; H, 8.19.

METHYL 3-KETO-9α-BROMO-11β-HYDROXY-4,17(20)-PREGNADIENE-21-OATE

To a solution of 3.40 grams (0.010 mole) of methyl 3-keto-4,9(11),17(20)-pregnatriene-21-oate in 120 milliliters of dioxane was added with stirring 1.78 grams (0.013 mole) of N-bromo-acetamide and twenty milliliters of a 25 percent aqueous solution of perchloric acid. Stirring was continued for ten minutes and one gram of sodium sulfite in 300 milliliters of water was then added. The mixture was thoroughly extracted with methylene chloride and the methylene chloride extract was washed successively with cold aqueous sodium bicarbonate and water, dried with anhydrous sodium sulfate and the methylene chloride then distilled at reduced pressure. The residue was dissolved in benzene and poured over a chromatographic column of 175 grams of Florisil synthetic magnesium silicate. The column was developed with 300 milliliter portions of solvents of the following composition and order: nine of Skellysolve B hexane hydrocarbons plus five percent acetone, seven of Skellysolve B plus 7.5 percent acetone, five of Skellysolve B plus ten percent acetone and one of acetone. The Skellysolve B plus 7.5 percent acetone eluate contained the methyl 3-keto-9α-bromo-11β-hydroxy-4,17(20)-pregnadiene-21-oate which, after crystallization from a mixture of acetone and Skellysolve B, weighed 2.53 grams, a yield of 58 percent of the theoretical, and melted at 105 to 108 degrees centigrade. Recrystallization of this product from the same solvent mixture raised the melting point to 108 to 109 degrees centigrade (decomposition). Infrared spectrum analysis was consistent with the structure.

METHYL 3-KETO-9 : 11-β-OXIDO-4,17(20)-PREGNADIENE-21-OATE

A mixture of 2.53 grams (5.78 millimoles) of methyl 3-keto-9α-bromo-11β-hydroxy-4,17(20) - pregnadiene-21-oate, three grams of anhydrous potassium acetate and 100 milliliters of absolute methanol was heated at the refluxing temperature of the mixture for 2.5 hours. The cooled solution was then diluted with two volumes of water and extracted thoroughly with methylene chloride. The methylene chloride extract was dried and then the solvent evaporated therefrom at reduced pressure. The residue was dissolved in benzene and then poured over a chromatographic column of 100 grams of Florisil synthetic magnesium silicate. The column was developed with 200 milliliter portions of solvents of the following composition and order: nine of Skellysolve B plus five percent acetone, five of Skellysolve B plus 7.5 percent acetone, five of Skellysolve B plus ten percent acetone, and one of acetone. The Skellysolve B plus five percent acetone eluates contained 1.24 grams, a yield of 54 percent of the theoretical, of methyl 3-keto-9:11-β-oxido-4,17(20)-pregnadiene-21-oate which, after crystallization from Skellyslove B containing a trace of acetone, yielded heavy needles melting at 123.5 to 125 degrees centigrade and and having an optical rotation $[\alpha]_D$ in chloroform of plus 48 degrees and the analysis below.

*Analysis.*—Calculated for $C_{22}H_{28}O_4$: C, 74.13; H., 7.92. Found: C, 74.33; H, 7.83.

METHYL 3-KETO-9α-FLUORO-11β-HYDROXY-4,17(20)-PREGNADIENE-21-OATE

A solution of four grams (1.12 millimoles) of methyl 3-keto-9:11-β-oxido-4,17(20)-pregnadiene-21-oate in fifty milliliters of alcohol-free chloroform was cooled to zero degrees centigrade. To the cooled solution was added 25 milliliters of a cold solution of anhydrous hydrogen fluoride in alcohol-free chloroform whereupon a red color developed. The solution was stored at minus fifteen degrees centigrade for four hours with occasional stirring. The solution was then washed with aqueous sodium bicarbonate and then with water. The washed chloroform solution was dried and then distilled to dryness. The partially crystalline residue was dissolved in benzene and poured over a column of 200 grams of Florisil synthetic magnesium silicate. The column was developed with 200 milliliter portions of solvents of the following composition and order: ten of Skellysolve B plus five percent acetone, five of Skellysolve B plus 7.5 percent acetone, five of Skellysolve B plus ten percent acetone, and one of acetone. The Skellysolve B plus 7.5 percent acetone eluates contained the methyl 3-keto-9α-fluoro-11β-hydroxy-4,17(20)-pregnadiene-21-oate which, after crystallization from a mixture of acetone and Skellysolve B, melted at 245 to 247 degrees centigrade, had an infrared spectrum absorption consistent with the structure and the analysis below. The Skellysolve B plus five percent acetone eluates contained 1.40 grams of starting steroid.

Calculated for $C_{22}H_{29}FO_4$: C, 70.19; H, 7.76; F, 5.05. Found: C, 70.28; H, 7.71; F, 4.86.

THE 3-ETHYLENE GLYCOL KETAL OF METHYL 3-KETO-9α-FLUORO - 11β - HYDROXY - 4,17(20)-PREGNADIENE-21-OATE

A mixture of 430 milligrams (1.4 millimoles) of methyl 3-keto-9α-fluoro-11β-hydroxy-4,17(20) - pregnadiene-21-oate, three milliliters of ethylene glycol, 100 milligrams of para-toluene-sulfonic acid monohydrate and fifty milliliters of anhydrous benzene was heated at the refluxing temperature of the mixture for six hours with concomitant and continuous removal of the water of reaction with a Dean-Stark water trap. The mixture was then cooled, washed with aqueous sodium bicarbonate and then with water, and distilled at reduced pressure to dryness. The crude crystalline residue consisted essentially of the 3-ethylene glycol ketal of methyl 3-keto-9α-fluoro-11β-hydroxy-4,17(20)-pregnadiene-21-oate.

THE 3-ETHYLENE GLYCOL KETAL OF 9α-FLUORO-11β,21-DIHYDROXY-4,17(20)-PREGNADIENE-3-ONE

The crude crystalline ketal obtained above was dissolved in 25 milliliters of benzene and then added dropwise to a stirred suspension of 0.5 gram of lithium aluminum hydride and fifty milliliters of ether. After the addition of the benzene solution was completed, the stirring was continued for 1.5 hours. The excess lithium aluminum hydride in the reaction mixture was then decomposed by the dropwise addition of five milliliters of ethyl acetate. Ten milliliters of water was then slowly added to the mixture followed by 25 milliliters of a solution of five milliliters of concentrated hydrochloric acid and twenty milliliters of water. The benzene layer was separated and washed with an aqueous solution of sodium bicarbonate followed by water. The benzene solution was then dried and distilled to dryness to leave a distillation residue consisting essentially of the 3-ethylene glycol ketal of 9α-fluoro-11β,21-dihydroxy-4,17(20)-pregnadiene-3-one.

9α-FLUORO-11β,21-DIHYDROXY-4,17(20)-PREGNADIENE-3-ONE

The crude 3-ethylene glycol ketal of 9α-fluoro-11β,21-dihydroxy-4,17(20)-pregnadiene-3-one, obtained as the distillation residue from the benzene solution obtained above was dissolved in 35 milliliters of acetone. To the solution was added five milliliters of a 1.0 N solution of sulfuric acid and the acidic mixture maintained with stirring at about 25 degrees centigrade for six hours. Water was then added to the mixture. The aqueous mixture was extracted with methylene chloride and the methylene chloride extract then washed with aqueous sodium bicarbonate followed by water. The extract was dried and the solvent distilled at reduced pressure. The residue was dissolved in a mixture of benzene and methylene chloride and poured over a chromatographic column of fifty grams of Florisil synthetic magnesium silicate. The column was developed with 100 milliliter portions of solvent of the following composition and order: five of Skellysolve B plus 7.5 percent acetone, seven of Skellysolve B plus ten percent acetone, five of Skellysolve B plus fifteen percent acetone, five of Skellysolve B plus twenty percent acetone and one of acetone. The Skellysolve B plus fifteen percent acetone eluates contained 190 milligrams of product. Trituration of this product with ether followed by crystallization from a mixture of ethyl acetate and ether gave fine needles of 9α-fluoro-11β,21-dihydroxy-4,17(20)-pregnadiene-3-one melting at 202.5 to 204 degrees centigrade and having the analysis below:

Analysis.—Calculated for $C_{21}H_{29}FO_3$: F, 5.45. Found: F, 5.55, 5.67.

9α-FLUORO-11β-HYDROXY-21-ACETOXY-4,17(20)-PREGNADIENE-3-ONE

Crude 9α-fluoro-11β,21-dihydroxy-4,17(20)-pregnadiene-3-one, obtained from the chromatographic column described above was dissolved in a mixture of five milliliters of acetic anhydride and five milliliters of pyridine. The solution was maintained at about 25 degrees centigrade for about sixteen hours and then poured into a mixture of ice and water. The gummy precipitate was extracted with methylene chloride and the extract then washed successively with ice cold dilute aqueous hydrochloric acid, cold aqueous sodium bicarbonate and finally with cold water. The methylene chloride solution, after drying, was poured over a chromatographic column of 75 grams of Florisil synthetic magnesium silicate. The column was developed with 150 milliliter portions of solvent of the following composition and order: five of Skellysolve B plus five percent acetone, eight of Skellysolve B plus 7.5 percent acetone, five of Skellysolve B plus ten percent acetone and one of acetone. The Skellysolve B plus 7.5 percent acetone eluates contained 9α-fluoro-11β-hydroxy-21-acetoxy-4,17(20)-pregnadiene-3-one which, after crystallization from a mixture of acetone and Skellysolve B, melted at 205 to 207.5 degrees centigrade and had the analysis below.

Analysis.—Calculated for $C_{23}H_{31}FO_4$: F, 4.87. Found: F, 4.24.

9α-FLUORO-11β,17α-DIHYDROXY-21-ACETOXY-4-PREGNENE-3,20-DIONE

Approximately 125 milligrams of impure 9α-fluoro-11β-hydroxy-21-acetoxy-4,17(20)-pregnadiene-3-one, obtained from the chromatographic column from a reaction performed in exactly the manner described in Example 12, was dissolved in eight milliliters of dry tertiary butyl alcohol containing one milliliter of dry pyridine. The solution was mixed at room temperature with stirring with 0.6 milliliter of a solution of 0.125 N solution of N-methyl-morpholineoxide peroxide, prepared by the reaction of N-methyl-morpholine with two molar equivalents of anhydrous hydrogen peroxide, in dry tertiary butyl alcohol. To this mixture was added five milligrams of osmium tetroxide and the solution stirred for 4.5 hours at about 25 degrees centigrade. Aqueous sodium sulfite was then added and the mixture extracted with methylene chloride. The extract was washed with water, dried and the solvent distilled. The distillation residue was dissolved in benzene and poured over a chromatographed column of fifteen grams of Florisil synthetic magnesium silicate. The column was developed with fifty milliliter portions of solvents of the following composition and order: five of Skellysolve B plus 7.5 percent acetone, five of Skellysolve B plus ten percent acetone, five of Skellysolve B plus fifteen percent acetone, three of Skellysolve B plus twenty percent acetone and one of acetone. The Skellysolve B plus fifteen percent acetone eluates were distilled to dryness leaving 47 milligrams of 9α-fluoro-11β,17α-dihydroxy-21-acetoxy-4-pregnene-3,20-dione (9α-fluorohydrocortisone acetate) melting at 195 to 200 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. Lower-alkyl 3-keto-11α-sulfonyloxy-4,17(20)-pregnadiene-21-oates represented by the following formula:

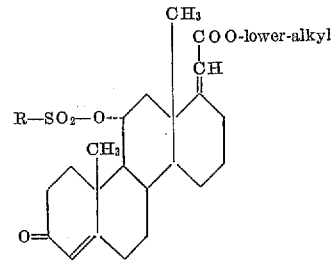

wherein R represents a member of the group consisting of alkyl hydrocarbon radicals of from one to eight carbon atoms, inclusive, and aryl hydrocarbon radicals of from six to twelve carbon atoms, inclusive.

2. The compounds of claim 1 wherein the lower-alkyl group is methyl.

3. The compounds of claim 1 wherein the lower-alkyl group is ethyl.

4. Lower-alkyl 3-keto-11α-arylsulfonyloxy-4,17(20)-pregnadiene-21-oates represented by the following formula:

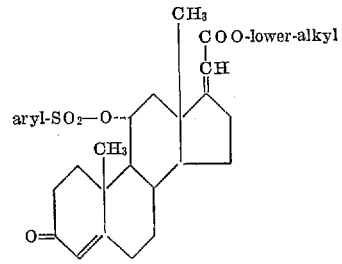

wherein aryl-$SO_2$—represents an arylsulfonyl radical containing from six to twelve carbon atoms, inclusive, and the aryl radical is hydrocarbon.

5. The compounds of claim 4 wherein the lower-alkyl group is methyl.

6. The compounds of claim 4 wherein the lower-alkyl group is ethyl.

7. Lower-alkyl 3-keto-11α-arylsulfonyloxy-4,17(20)-pregnadiene-21-oates represented by the following formula:

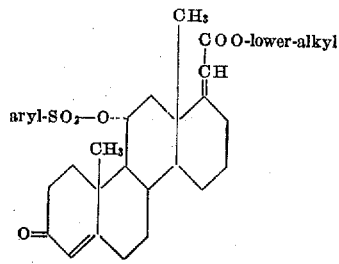

wherein aryl-$SO_2$— is a monocyclicarylsulfonyl radical containing from six to twelve carbon atoms, inclusive and the aryl radical is hydrocarbon.

8. Methyl 3-keto-11α-(para-toluenesulfonyloxy)-4,17(20)-pregnadiene-21-oate.

9. Ethyl 3-keto-11α-(para-toluenesulfonyloxy)-4,17(20)-pregnadiene-21-oate.

References Cited in the file of this patent

UNITED STATES PATENTS

| | | |
|---|---|---|
| 2,409,798 | Reichstein | Oct. 22, 1946 |
| 2,695,906 | Hogg | Nov. 30, 1954 |

UNITED STATES PATENT OFFICE
Certificate of Correction

Patent No. 2,799,688                                July 16, 1957

Robert W. Jackson et al.

It is hereby certified that error appears in the printed specification of the above numbered patent requiring correction and that the said Letters Patent should read as corrected below.

Column 2, line 66, for "9(11)-dihydrohydrocortisone" read —9(11)-dehydrohydrocortisone—; column 4, line 17, in the heading to Example 1, for "*(para-toluenesulfonyl)-*" read —*(para-toluenesulfonyloxy)*- —; column 8, lines 39 to 49, claim 1, the formula should read as shown below instead of as in the patent—

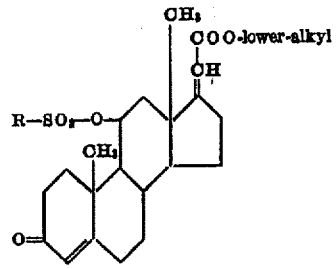

column 9, lines 8 to 19, claim 7, the formula should appear as shown below instead of as in the patent—

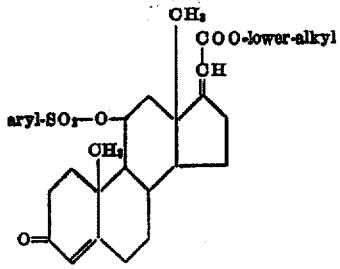

Signed and sealed this 24th day of September 1957.

[SEAL]

Attest:
KARL H. AXLINE,
*Attesting Officer.*

ROBERT C. WATSON,
*Commissioner of Patents.*